United States Patent [19]

Dabisch et al.

[11] Patent Number: 4,695,528
[45] Date of Patent: Sep. 22, 1987

[54] PROCESS FOR FORMING IMAGES USING BODY WITH REVERSIBLE FIXABLE AND TEMPERATURE-VARIABLE LIGHT EXTINCTIONS

[75] Inventors: Wolfgang H. Dabisch, Scharfensteinstr. 18, 6228 Eltville; Peter Kung, Kelkheim; Siegfried R. Muller, Destrich-Winkel; Krishnamoorthy Narayanan, Eltville, all of Fed. Rep. of Germany

[73] Assignee: Wolfgang Dabisch, Fed. Rep. of Germany

[21] Appl. No.: 425,763

[22] Filed: Sep. 28, 1982

Related U.S. Application Data

[62] Division of Ser. No. 123,582, Jul. 16, 1980, abandoned.

[51] Int. Cl.⁴ .............................. G03C 5/00
[52] U.S. Cl. .................. 430/290; 430/19; 430/31; 430/50; 430/152; 430/269; 430/346; 430/347; 430/348; 430/945; 250/317.1
[58] Field of Search .............. 430/290, 269, 19, 346, 430/945, 347, 350, 152, 31, 50, 348; 250/317.1

[56] References Cited

U.S. PATENT DOCUMENTS 3,180,752  4/1965  Bollinger et al. ............ 430/346
3,342,618  9/1967  Peticolas .................... 250/317.1
3,501,297  3/1970  Cremeans .................... 430/942
3,607,273  9/1971  Kinney ....................... 430/290
4,268,413  5/1981  Dabisch ...................... 252/408.1

Primary Examiner—Charles L. Bowers, Jr.
Attorney, Agent, or Firm—Biebel, French & Nauman

[57] ABSTRACT

In order to be able, in a simple manner, to erase, by heating, data recorded on bodies with reversible, temperature-variable light extinctions, and then to be able to use the body anew for the recording of data, these bodies consists of at least one polymer material and/or resin matrix material (A) and at least one organic low-molecular substance (B), which is insoluble, at least partially, in the latter and which is contained therein as a dispersed second phase, whereby the pair of materials (A/B) possess variable light extinctions below a specific temperature ($T_0$) in dependence on a previous heating above $T_0$ and are so constituted that, upon being heated above a conversion temperature ($T_2$) which lies above $T_0$, and being cooled off subsequently to below $T_0$, yields maximum light extinction; and, upon being heated in the state of maximum light extinction to a temperature ($T_1$) which lies above $T_0$ and below $T_2$, and subsequent cooling off to below $T_0$, yields light extinctions which become smaller with increasing temperature; and, upon being heated to a temperature between $T_1$ and $T_2$ and subsequent cooling off to below $T_0$, yields minimum light extinctions.

Such bodies—in film form or in the form of coatings, for example—can be employed as erasable microfilms and other erasable record carriers.

21 Claims, 4 Drawing Figures

PROCESS FOR FORMING IMAGES USING BODY WITH REVERSIBLE FIXABLE AND TEMPERATURE-VARIABLE LIGHT EXTINCTIONS

This is a divisional of application Ser. No. 123,582 filed July 16, 1980, abandoned.

It is customary to record information of all sorts, including data, pictures (or images), characters (or letters), designs, etc., on transparent carriers, in order to store them optically visibly and to be able to either copy or project them. In this way microfilms and the like, for example, are produced. As is well known, recording is accomplished optically with the aid of a light-sensitive layer (or film), the recording process including development and fixing of the information to be recorded.

Frequently, information recorded in such a manner is secret or at least should not fall into foreign (or strange) hands. When such information carriers are no longer needed, they therefore must be carefully destroyed; frequently, comminution does not suffice for this, since in the case of microfilms, for instance, the characters are so small that the pieces obtained by comminution still contain undesired coherent information. In such cases, therefore, it is necessary to destroy the film (or layer) chemically, which is costly in energy expended and is disagreeable because of the use of chemical solutions, especially when large quantities of record carriers are to be destroyed. Moreover, such known types of record carriers, from which the information was erased, cannot be used again.

Consequently, the problem forming the basis of the invention resided in acquiring new data-storage and recording materials whose recorded data can be erased in the simplest possible manner and which can thereafter be used anew for the recording of data.

In accordance with the invention, this problem can be solved by means of bodies with reversibly fixable and temperature-variable light extinctions, and these bodies are characterized by consisting of at least one polymer material and/or resin material (A) and at least one organic low-molecular substance (B), at least partially insoluble in (A) and contained therein as a dispersed second phase, the pair of materials (A/B) possessing variable light extinctions below a specific temperature ($T_0$) in dependence on a previous heating above $T_0$ and being so consistuted that it yields maximum light extinction upon being heated above a conversion temperature ($T_2$) lying above $T_0$ and being subsequently cooled below $T_0$, and yields light extinctions of diminishing magnitude upon being heated, in the state of maximum light extinction, to a clear temperature ($T_1$) lying above $T_0$ and below $T_2$ and being subsequently cooled below $T_0$, and yields minimal light extinction upon being heated to a temperature between $T_1$ and $T_2$ and being subsequently cooled below $T_0$.

When "bodies" are mentioned here, they may have various forms, such as, for instance, plates, blocks, films, tubes, and the like, or they may have the form of a coating on another carrier, such as a transparent foil (or film). Thus the concept of "body" is here used in the broadest sense.

When information, data, or recordings are mentioned here, these concepts also should be understood in the broadest sense, such as numerals, letters, images, patterns for decorative purposes, or the like.

With the subject matter of the invention, it has surprisingly been found that in accordance with the invention it is possible to produce recordings by means of simple heat development without after-treatment and without chemical wet processes; that is, also without development processes and fixing processes, as are necessary in the case of light-sensitive films. It is especially surprising that the recordings produced by means of heat can be erased exclusively through the action of heat without the necessity for chemical processes or wet treatments.

Furthermore it is surprising that the record materials thus erased can be used anew for data recordings, the recording process and the erasing process being able to be repeated as often as desired.

The heat required for the production of images can be supplied in any desired manner, preferably by means of finely-focused heat or light radiation or by means of contact heat from electrical conducting paths. The finer the concentration of heat radiation and the dimensions of the conducting paths, the sharper are the recordings which can be obtained. With laser beams, a possibility of high resolution is obtained, in the order of magnitude of $10^{-6}$ m. This high resolution possibility leads to sharper reproduction of images.

The images obtained on the recording materials according to the invention can be clearly recognized with the eye, or can be read off with ordinary photoelectric apparatus in the microscopic range. Data recordings are possible in accordance with the analog process as well as in accordance with the digital process.

Astoundingly, even intermediate tones or shades can be produced with the subject matter of the invention, so that, with suitable adjustment of temperature, photograph-like images with high resolution power can be obtained.

Recordings can be accomplished in the positive process as well as in the negative process. If one begins with the state of minimal light extinction—that is, with the maximal transparent state—one obtains opaque images, such as characters and the like, one the transparent ground by heating above the conversion temperature $T_2$. These have all the maximum opacity obtainable. In order to obtain half-tones or gray tints, with this positive process, the image range of maximal opacity which is to be illuminated must be heated in a second process to a temperature between $T_0$ and $T_1$, a variable illumination being obtained in this range according to the heating temperature. With the positive process, each recorded element can be completely erased by being heated to a temperature between $T_1$ and $T_2$. Thereby the place to be corrected becomes entirely transparent again. Then, by subsequent renewed heating of this place to a temperature above $T_2$, the correct recording element can be inserted at the same place.

With the negative process, one begins with the state of maximum opacity or maximum light extinction. By heating to a temperature in the range between $T_0$ and $T_1$, one acquires any desired gray tints between the state of maximum opacity and the state of maximum transparency, according to the temperature of heating. These gray tints can be obtained in one operation with the negative process.

Independently of whether one works with the negative process or according to the positive process, one can obtain a resolution power of at least 300 to 400 lines per millimeter, so that the process is suited for any sort of optical data recording, even for the production of microfilms. The film (or layer) can be colored slightly for better absorption of laser beams, and in that case individual points with a diameter of less than 0.003 mm. can be recorded, the time required for the recording of a point lying within the range of microseconds, according to the energy of the laser beams. The recordings can be erased with the same laser beams but with reduced power.

The dimensions of the bodies according to the invention may be selected to be any desired. The preferred embodiment of these bodies consists of a transparent carrier foil (or film) with a coating of the pair of materials A/B. The thickness of this coating can be varied at will and lie between about $10^{-6}$ m. and a few millimeters, for example. Coatings with a thickness between $10^{-6}$ m. and $10^{-4}$ m. are preferred. It goes without saying, of course, that the pairs of materials A/B can also form self-supporting foils or films if matrix materials are selected which, together with the embedded organic low-molecular substances, are sufficiently mechanically stable that they do not have to be supported on an additional carrier.

Figure 1:
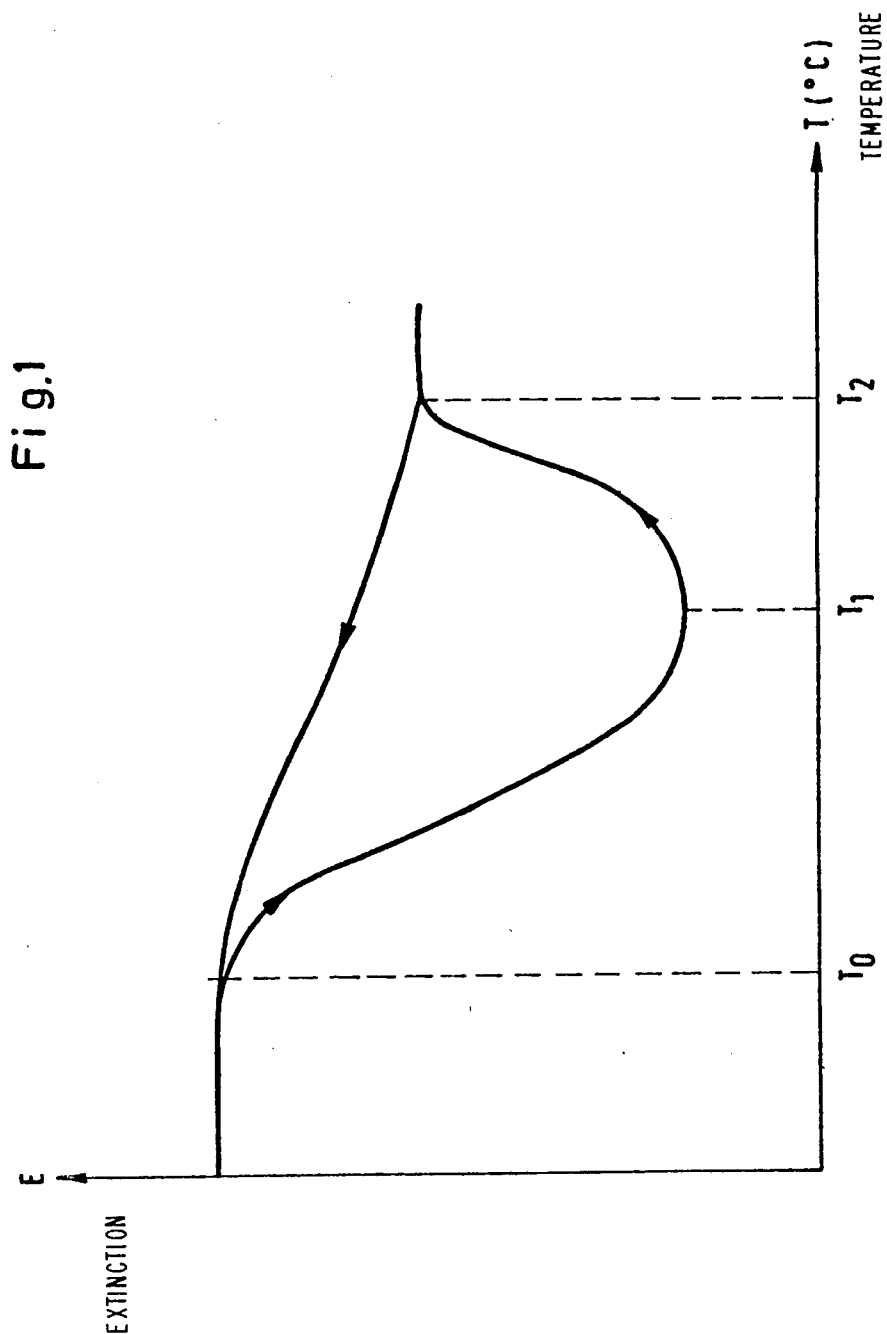
FIG. 1 is a graphic representation of a typical course of the curve of the dependence of light extinction on heating temperature in the case of a pair of materials A/B in accordance with the invention.

The behavior of the pairs of matrix materials A and low-molecular organic substance B, to be used in accordance with the invention, will be explained with reference to FIG. 1. If one applies the light extinction against the heating temperature, one can obtain various curves with the pairs of materials according to the invention, although these curves all conform to the principles indicated above.

If one takes a body made of a pair of materials A/B according to the invention in the state of maximum opacity and heats this body beginning with temperature $T_0$ but does not go above temperature $T_1$, the opacity becomes more and more illuminated in accordance with the increase in temperature; that is, the body becomes more light-transmitting—that is, more transparent—at the places mentioned. Upon cooling off to temperature $T_0$ or below, this intermediate turbidity value remains maintained between maximum opacity and maximum transparency, or remains substantially maintained. In this manner it is possible to produce half-tone or gray tints with the recordings in accordance with the invention.

However, if one heats the material up to temperature $T_1$ or above this temperature up to temperature $T_2$, then maximum transparency or minimum light extinction occurs when the body is cooled off to temperature $T_0$ or below.

Thus one need not heat to a precise temperature value in order to obtain maximum transparency; it suffices to heat the places to be made transparent to a temperature anywhere between $T_1$ and $T_2$. The greater the temperature interval between $T_1$ and $T_2$, the easier it is to attain maximal light transmissibility without the danger of intermediate values or return to maximum opacity. Preferably, the difference between $T_1$ and $T_2$ amounts to at least 5 degrees C., 5 to 50 being particularly preferred, and especially 5 to 15 degrees C. In the negative process, if the difference between $T_1$ and $T_2$ is too large, one must heat the recordings too hot in the erasing process, which can be disadvantageous with certain matrix materials or applications.

If the body according to the invention is heated to temperature $T_2$ or above, then maximum opacity necessarily occurs upon cooling off.

According to temperature adjustment at the places of the body according to the invention in question, then, according to choice, maximum opacity, maximum transparency, or an opaque intermediate tone dependent on the action of temperature can be obtained.

It a positive process is used in contrast to the above-described negative process, and if one begins with a body according to the invention in the state of maximum transparency, this transparency remains at maximum initial value up to conversion temperature $T_2$ after cooling off. Only after temperature $T_2$ or a temperature above that is reached does the body become opaque on cooling off and reach maximum opacity.

Thus, starting from the transparent state, no intermediate tints can be obtained, but only maximum transparency and maximum opacity, although, as explained above, any desired intermediate tints can be obtained by a second heating of the already-opaque sites to a temperature between $T_0$ and $T_1$.

Figure 2:
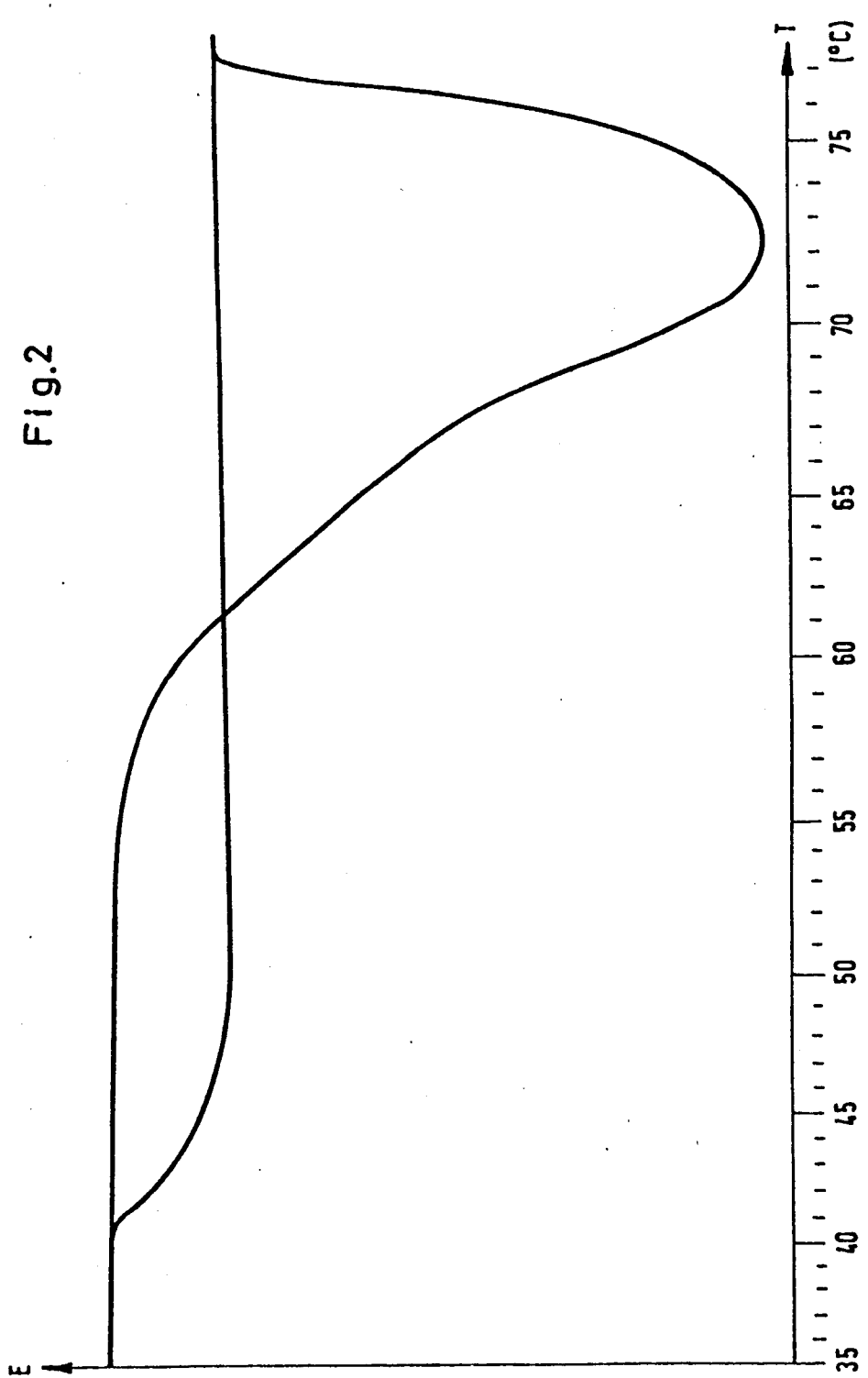
FIG. 2 is the corresponding curve for the concrete pair of materials of Example 1.
Figure 3:
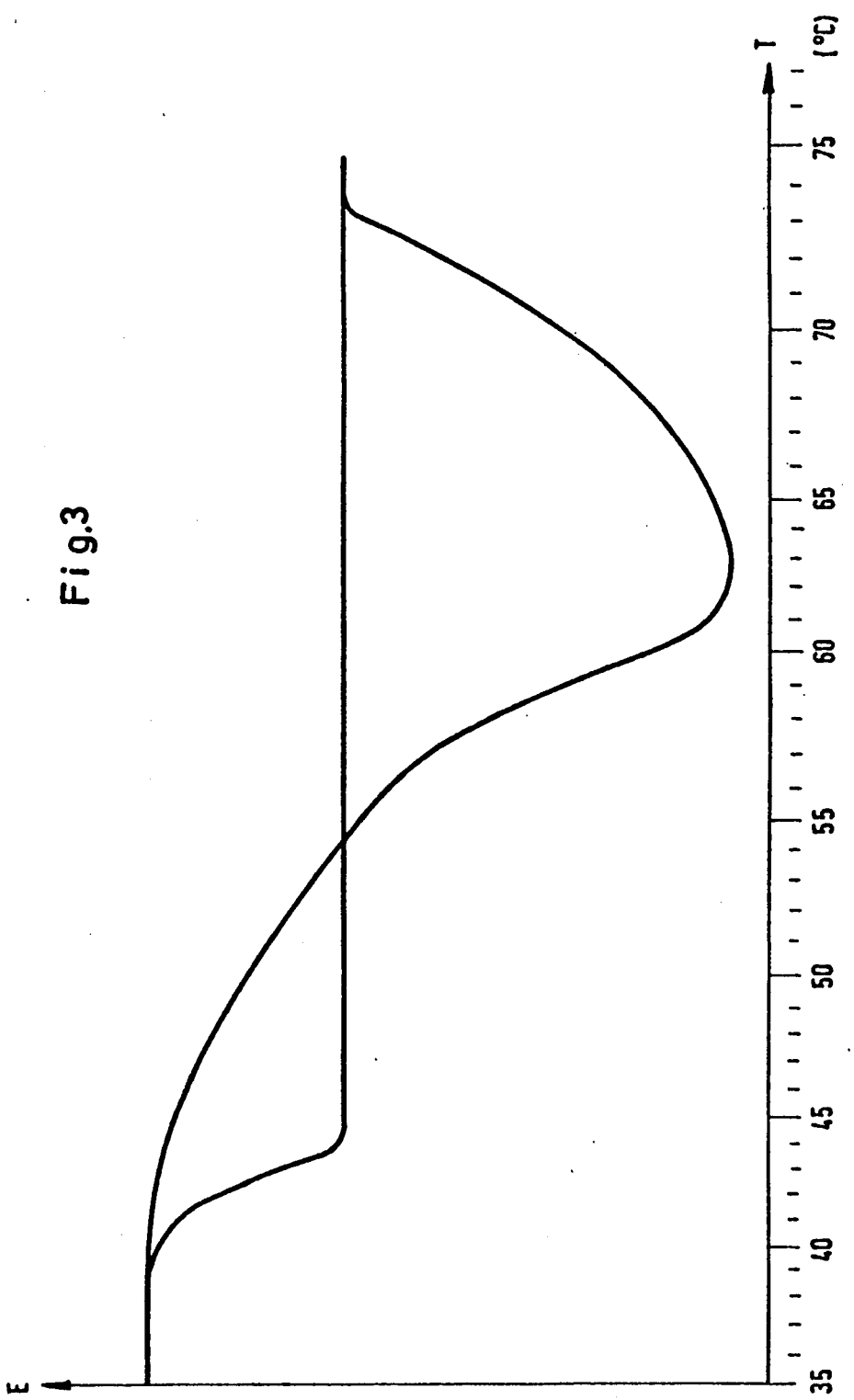
FIG. 3 is the corresponding curve for the concrete pair of materials of Example 2.
Figure 4:
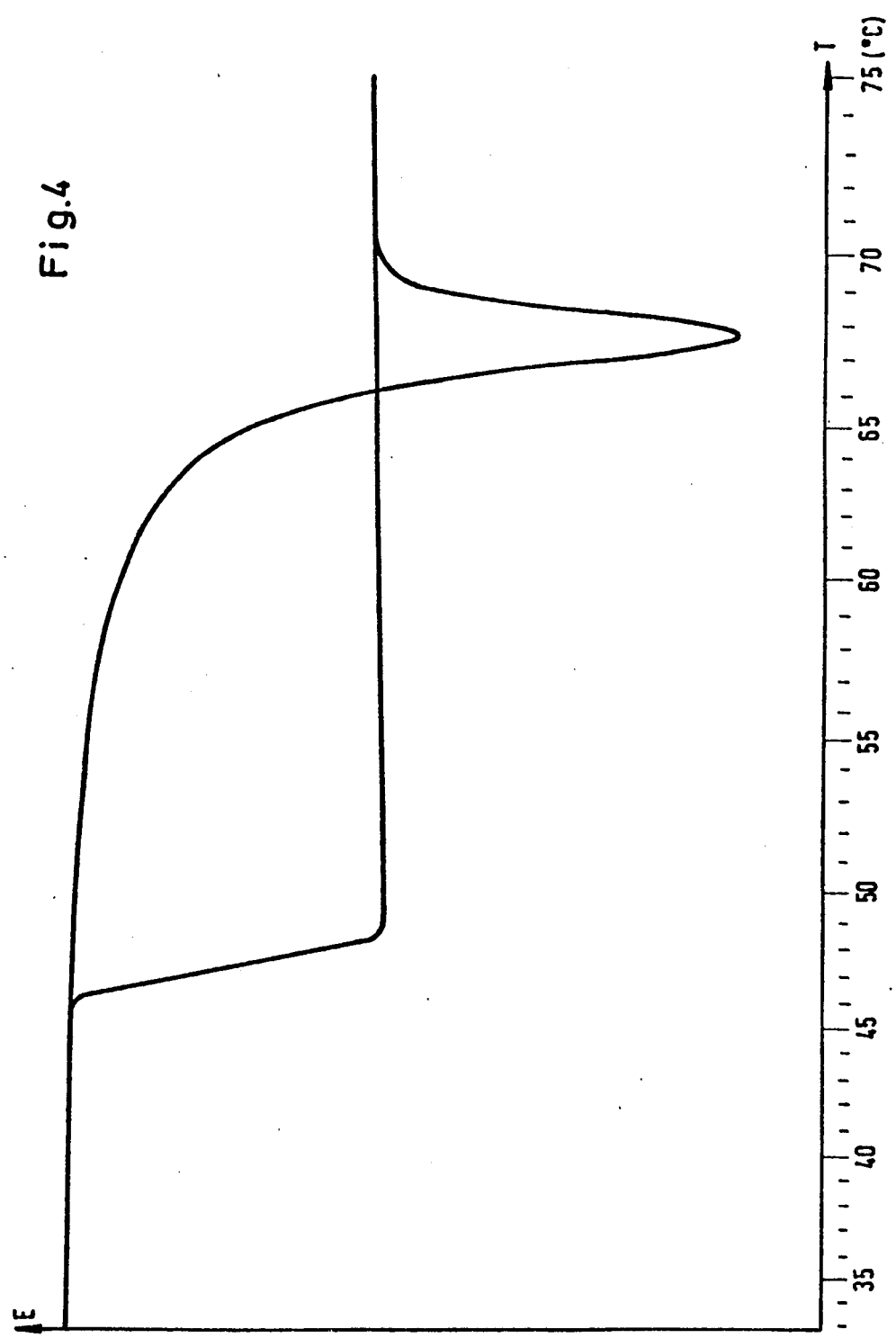
FIG. 4 is the corresponding curve for the conrete pair of materials of Example 3.

FIGS. 2 to 4 show concrete embodiments of pairs of materials according to embodiments 1 to 3.

Thus on the basis of the above technical teaching it is possible for one skilled in the art, in a few routine experiments, to select those pairs of materials which come within the subject matter of the invention. For this, all that he needs from the pair of materials which has been obtained from dispersing Substance B in Matrix Material A is to make a diagram of light extinction in dependence on temperature, or of light transmissibility in dependence on temperature, which latter is possible with commercial apparatus and automatic recorders. When the curve obtained thereby shows the above-described course with a conversion temperature $T_2$ and a clear temperature $T_1$, the pair of materials necessarily corresponds to the subject matter of the invention.

Appropriately, the organic low-molecular substance (b), in solid state, at ambient temperature, has a refractive index which comes as close as possible to that of the matrix material (A), since then maximum transparency is attained in the transparent state. Thus the pair of materials A/B can be selected in accordance with this criterion.

Temperature $T_2$ conforms substantially to the melting point or solidification point of the organic low-molecular substance (B). Therefore the latter can be adduced as a further criterion for selection.

Preferably, pairs of material A/B are so selected that the organic low-molecular substance (B) possesses two different configurations in the solid state, such as crystal forms, for example, which have different refractive indices, a configuration which is stable at room temperature having a refractive index which comes as close as possible to that of the matrix material (A), and a configuration which is stable at room temperature having a refractive index which lies between the latter and that of melting of the organic low-molecular substance (B). In interplay with the matrix material (A), corresponding configurations of Substance (B) can be obtained in dependence on temperature pretreatment.

The organic low-molecular substance (B) is embedded in the matrix material (A) as a second—that is, discrete—phase and appropriately is finely divided in the form of small to smallest particles, as droplets or as crystallite. The degree of fine-dividing of the organic substance in the matrix material can be adjusted according to the desired effect and the purpose of use.

The organic substance (B) can be worked into the matrix material in various ways and finely divided therein. One method consists of mixing monomers and/or oligomers and/or prepolymers of the matrix material (A) with the organic substance (B) and, if necessary, adding a hardener for the monomers, oligomers, or prepolymers, and polymerizing this mixture to form the matrix material (A) and give it shape. The organic substance (B) can be present thoroughly dissolved in the monomers, oligomers, or prepolymers of the matrix material also far as incompatibility or difficult solubility or phase separation occur at any point in time during polymerization, so that finally the matrix material and the organic substance are actually present as two separate phases, of which that organic substance (B) which is ordinarily dispersed in the matrix phase, in more or less finely-divided form, is the inner or dispersed phase.

Another method consists of mixing the organic substance (B) with a solution of the matrix material in an organic solvent and then evaporating the solvent to give shape to the matrix material. Here also, the organic substance can dissolve completely in the common solution, but, upon evaporation of the solvent at any point in time, it must precipitate as a second phase. Of course it goes without saying that it is also possible to so select the substances that the organic substance (B) does not, on the whole, dissolve completely in the solution of matrix material but always remains dispersed therein as a second phase; care must be taken here to obtain a finely-divided dispersion, somewhat in the form of small droplets or crystallites, possibly by means of efficient stirring devices, ultra-sound, or effective comminution of the solid material.

Another method consists of melting the matrix material, then admixing or dispersing the organic substance (B), and finally cooling off, after thoroughly blending the matrix material, to give it shape.

Shaping can consist in allowing the matrix material, with the finely-divided organic substance (B) therein, to polymerize, harden, or solidify in a form; then, with customary types of extruders with mouthpieces, forming the matrix material into sheets or plates or other molded articles; or using other customary forming methods, such as foil-forming processes; or allowing the matrix material to polymerize as a coating on another transparent body such as a glass plate or a transparent sheet of synthetic (or plastic) material; or allowing a coating to form on this transparent body, such as a glass plate, by evaporating the solvent or by solidification. Fundamentally, all known forming methods can be used, since the matrix material is a polymer material or a resin material, the molding of which is known to one skilled in the art.

The matrix materials can be thermoplastic or duroplastic synthetic materials or natural or synthetic resins; they can harden into elastomers or rigid bodies.

The most varied classes of materials can be employed as matrix materials, special selection being determined on one hand according to the refractive index and on the other hand according to the physical properties required for a special purpose of application. They should be as mechanically stable and as film-forming as possible. Examples of suitable matrix materials are polyesters, polyamides, polystyrol, polyacrylates, and polymethacrylates as well as silicon resins. Of the polyesters, the high-molecular linear saturated polyesters, especially those with molecular weights of 10,000 to 20,000, are particularly suitable. Especially serviceable as matrix material are vinylidene chloride copolymers, such as polyvinylidene chloride-acrylic nitrile-copolymers, polyvinyl chloride, vinyl chloride copolymers, vinyl acetate copolymers, and vinyl chloride-vinyl acetate copolymers and/or polyesters. Special examples of matrix materials are polymers of 91% by weight of vinyl chloride, 3% by weight of vinyl acetate, and 6% by weight of vinyl alcohol; 83% by weight of vinyl chloride, 16% by weight of vinyl acetate; and 1% by weight of maleic acid; or 90% by weight of vinyl chloride, 5% by weight of polyvinyl acetate, and 5% by weight of vinyl alcohol; vinyl chloride-acrylate copolymers; terpolymerisates with free carboxyl groups; and polymers of 83% by weight of vinyl chloride, 16% by weight of vinyl acetate; and 1% by weight of dicarboxylic acid. Commercial names of such polymers are Vinylite VAGH, VMCC, and VROH (Union Carbide), Vinnol E 5/48A and H 15/45M (Wacker-Chemie), and Vilit MC 39 (Chemische Werke Huls AG). Matrix materials (A) which show white fracture are more favorable to use.

It is favorable to keep the weight ratio of organic substance (B) to matrix material (A) within the range of 1:3 to 1:16, preferably 1:6 to 1:12, so that 3 to 16, preferably 6 to 12, parts by weight of matrix material form a part by weight of the organic substance (B). Particularly serviceable organic substances (B) are those with at least one hetero atom, especially oxygen, nitrogen, sulfur, and/or halogen, in the molecule.

Examples of suitable organic substances (B) are alkanoles; alkandioles; halogen alkanoles or halogen alkandioles; alkyl amines; alkanes; alkenes; alkines; halogen alkanes, halogen alkenses, or halogen alkines; cycloalkanes, alkense, and alkines; saturated or unsaturated mono- or di-carboxylic acids or esters, amides, or ammonium salts of the same, saturated or unsaturated halogen fatty acids or esters, amides, or ammonium salts of the same; acrylic carbonic acids or their esters, amides, or ammonium salts; halogen aryl carbonic acids or their esters, amides, or ammonium salts; thio alcohols; thio carbonic acids or their esters, amides, or ammonium salts; or carboxylic acid esters of thio alcohols, as well as mixtures of the same, all these compounds appropriately containing 10 to 60, preferably 10 to 38, especially 10 to 30, carbon atoms. In the esters, the alcohol groups for their part may be saturated or unsaturated and/or halogen substituted. In these compounds, the halogen atoms are, appropriately, chlorine or bromine, especially chlorine. Appropriately, the halogen compounds contain one or two halogen substituents. Such compounds as contain at least one straight-chain aliphatic group, appropriately with 10 to 30 carbon atoms, have proven to be particularly favorable as organic substance (B). In the acrylic groups, the aryl group is preferably phenyl or substituted phenyl.

In the case of (B) substances, "low-molecular" preferably means molecular weights of 100 to 700, preferably 300 to 500. Appropriately, one will employ such substances (B) as show a volume change of at least 5%, preferably from 5% to 15%, in phase alteration from solid to liquid or vice versa.

In order to improve the optical properties, as for increasing optical absorption in a specific wave-length range or for increasing the contrast with relation to the environment, one can add dyestuffs, brighteners, ultraviolet absorbers, or infra-red absorbers to the given pairs of materials A/B. In the case of use of laser beams to record data, it is possible so to adjust the dyestuff or the wave-length of the laser with relation to each other that a heat energy as high as possible is supplied at a given resonance frequency. Also, suitable wetting media and flow auxiliary means can be added to the mixture of materials, as utilized in the lacquer industry, for example, for obtaining better adhesion and surface smoothness.

When "pairs of materials (A/B)" are mentioned above, this means that the A component may consist of one or more polymers or resins, and the B component may consist of one or more organic low-molecular substances.

Because of their particularly surprising properties, the bodies according to the invention can be used to advantage as erasable record carriers. These can be used in various areas of application, such as data storage, for decorative purposes, for advertising purposes, and others.

The following examples serve to illustrate the invention further.

EXAMPLE 1

10 parts by weight of a high-molecular linear copolyester on the basis of aromatic dicarboxylic acids and aliphatic dioles (Polyester Dynapol L 206 of the Dynamit Nobel firm) are melted at about 160 degrees C. A portion of docosanic acid is admixed with this melt, and the melt is coated as a 0.01-mm.-thick film on a glass plate.

The thermofunctional film thus produced is opaque/-white after cooling off the room temperature and shows a fixed transparency upon being heated to 72° C. and subsequent cooling off; this can be converted back into the opaque state only by renewed heating to temperatures above 77° C.

FIG. 2 shows the dependence of light extinction on temperature for this material.

EXAMPLE 2

6 parts be weight of a 5% solution of docosanic acid in tetrahydrofurane is admixed with 6 parts by weight of a 30% solution of a copolymer of vinylidene chloride and acrylic nitrile (Saran F 310 of the Dow Chemical Company firm).

To improve the flow properties, 0.2% of a 16% solution of FC 430 (fluorad wetting agent of the 3M Company) in tetrahydrofurane is admixed. This mixture is coated on a 0.050-mm.-thick sheet of polyterephthalic acid glycolester in such a manner that a film thickness of 0.01 mm. results after evaporation of the solvent. The thermofunctional film is opaque/white and, upon being heated to 63° C. and subsequent cooling off, shows a fixed transparency, which can be converted back to the opaque state only by being heated anew to temperature above 74° C.

In addition, with suitable temperature control, as many stages as desired between maximum and minimum extinction temperatures between 40° and 64° C. can be obtained.

FIG. 3 shows the dependence of light extinction on temperature for this material.

EXAMPLE 3

6 parts by weight of a 10% solution of docosanol in tetrahydrofurane is admixed with 6 parts by weight of a 30% solution of a vinyl chloride-vinyl acetate copolymer (Vilit AS 47 of the Chemische Werke Huls A.G. Firm) in methyl isobutyl ketone. This solution is coated onto a 0.075-mm.-thick sheet of polyterephthalic acid glycol ester in such a manner that a film about 0.01 mm. thick results after evaporation of the solvent. The thermofunctional film thus obtained is opaque-white and, upon being heated to 68° C. and subsequent cooling off, exhibits a fixed transparency, which can be converted back into the opaque state only by being heated anew to temperatures above 70° C.

FIG. 4 shows the dependence of light extinction on temperature for this material.

EXAMPLE 4

One portion of docosanic acid is dissolved in 6 parts by weight of a 20% solution at a polyester on the basis of a mixture of aromatic and non-aromatic dicarboxylic acids and alphatic dioles (Polyester Dynapol L 206 of the Dynamit Nobel firm) in trichloro ethylene. With the aid of a wire wiper (or doctor), this solution is coated onto a 0.075-mm.-thick foil of polyterephthalic acid glycol ester in such a manner that a film 0.02 mm. thick results after evaporation of the solvent.

The thermofunctional film thus produced is opaque-white and, upon being heated to 72° C. and then being cooled off to temperatures below 72° C., exhibits a fixed transparency, which can be converted back into the opaque state only by being heated anew to temperatures above 77° C.

What is claimed:

1. An imaging process which comprises:
    image-wise heating a body to a temperature in excess of $T_0$, and allowing said body to cool to a temperature of $T_0$ or below,
    said body comprising at least one organic polymeric or resinous matrix material (A) and at least one organic low molecular material (B);
    said material (B) having 10 to 60 carbon atoms, being at least partially insoluble in said material (A) and being contained in said material (A) as a dispersed second phase, exhibiting a change in volume of at least 5% upon changing from a solid phase to a liquid phase or changing from a liquid phase to a solid phase, and in the solid state at ambient temperature, exhibiting a refractive index which closely approximates or is the same as the refractive index of the material (A) and being selected from the group consisting of an alkanol; an alkandiol; a haloalkanol or a haloalkandiol; an alkylamine; an alkane; an alkene; an alkyne; a cycloaklane; a cycloalkene; or a cycloalkyne; a saturated or unsaturated mono- or -di-carboylic acid or an ester or an amide or an ammonium salt of the same; a saturated or unsaturated halogen fatty acid or an ester, an amide; or an ammonium salt of the same; an aryl carboxylic acid or an ester, an amide, or an ammonium salt thereof; a haloaryl carboxylic acid or an ester, an amide, or an ammonium salt of the same; a thiol; a thiocarboxylic acid or an ester, an amide or an ammonium salt thereof; or a carboxylic acid ester of a thiol or mixtures thereof, wherein in the aforesaid esters the alcohol groups can be saturated or unsaturated and/or halogen-substituted, said materials (A) and (B) being selected such that they provide said body with a variable light extinction characteristic at a temperature below a temperature $T_0$ in dependence upon prior heating to a temperature above $T_0$, said organic material (B) being present in a weight ratio to the matrix material (A) of approximately 1:3 to 1:16, said variable light extinction characteristic being such that maximum light extinction is obtained by heating said body above a temperature $T_2$ which lies above $T_o$ and cooling to a temperature below $T_0$; minimum light extinction is obtained by heating said body above a temperature $T_1$ lying between $T_0$ and $T_2$ and cooling to a temperature below $T_0$; and light extinctions of varying magnitude are obtained by heating said body to a temperature between $T_0$ and $T_1$, and cooling to a temperature below $T_0$; wherein;

images having maximum light extinction are obtained by image-wise heating said body when said body is in a state in which said body exhibits minimum light extinction at a temperature below $T_0$, to a temperature above a temperature $T_2$ and cooling to below $T_0$, images having light extinction of diminishing magnitude are obtained by image-wise heating said body when said body is in a state in which said body exhibits maximum light extinction at a temperature below $T_0$, to a temperature T between $T_0$ and $T_1$, and cooling to below $T_0$, and images of minimum light extinction are obtained by image-wise heating said body when said body is in a state in which said body exhibits maximum light extinction or extinction of diminished magnitude at a temperature below $T_0$, to a temperature between $T_1$ and $T_2$ and cooling to below $T_0$.

2. The imaging process of claim 1 wherein said body is heated from a state in which said body exhibits minimum light extinction at a temperature below $T_0$, to a temperature above a temperature $T_2$ and cooled to a temperature below $T_0$ to form images having maximum light extinction.

3. The imaging process of claim 1 wherein said body is heated from a state in which said body exhibits maximum light extinction at a temperature below $T_0$, to a temperature above $T_0$ and below $T_2$ and cooled to a temperature below $T_0$ to form images having extinction of diminishing or minimum magnitude.

4. The imaging process of claim 1 which further comprises the step of uniformly heating said body to an erasure temperature above said temperature $T_0$ to erase said images.

5. The imaging process of claim 4 wherein said erasure temperature is a temperature above $T_1$ but below $T_2$ and uniformly minimum light extinction is obtained in said body at a temperature below $T_0$.

6. The imaging process of claim 4 wherein said erasure temperature is a temperature above $T_2$ and uniformly maximum light extinction is obtained in said body at a temperature below $T_0$.

7. The imaging process of claim 1 wherein said organic material (B) comprises a compound containing at least one heteroatom selected from the group consisting of oxygen, sulfur, nitrogen and halogen.

8. The imaging process of claim 1 wherein said matrix material (A) is selected from the group consisting of polyesters, polyvinyl chlorides, vinyl chloride-vinyl acetate copolymers, vinyl acetate copolymers, vinyl chloride copolymers, and vinylidene chloride copolymers.

9. The imaging process of claim 1 wherein said matrix material (A) is a material which exhibits white fracture.

10. The imaging process of claim 1 wherein said materials (A) and (B) are selected such that the difference between $T_1$ and $T_2$ is at least 5° C.

11. Am imaging process which comprises:

image-wise heating a body to a temperature in excess of room temperature, and allowing said body to cool from said temperature to room temperature;

said body comprising at least one organic polymeric or resinous matrix material (A) and at least one organic low molecular material (B);

said low molecular material (B) containing 10 to 60 carbon atoms, exhibiting a change in volume of at least 5% upon changing from a solid phase to a liquid phase or changing from a liquid phase to a solid phase, being at least partially insoluble in said material (A), exhibiting a solid state refractive index which closely approximates or is the same as the refractive index of said material (A), and being selected from the group consisting of:

an alkanol; an alkandiol; a haloalkanol or a haloalkandiol; an alkylamine; an alkane; an alkene; an alkyne; a cycloalkane; a cycloalkene; or a cycloalkyne; a saturated or unsaturated mono- or -di-carboxylic acid or an ester of an amide or an ammonium salt of the same; a saturated or unsaturated halogen fatty acid or an ester, an amide; or an ammonium salt of the same; an aryl carboxylic acid or an ester, an amide, or an ammonium salt thereof; a haloaryl carboxylic acid or an ester, an amide, or an ammonium salt of the same; a thiol; a thiocarboxylic acid or an ester, an amide or an ammonium salt thereof; or a carboxylic acid ester of a thiol or mixtures thereof, wherein in the aforesaid esters the alcohol groups can be saturated or unsaturated and/or halogen-substituted, said matrix material (A) and said low molecular material (B) being present in said body in a weight ratio of said material (B) to said material (A) of approximately 1:3 to 1:16; and matrix material (A) and said low molecular material (B) being selected such that said body possesses a temperature variable light extinction at room temperature in dependence upon heating to a temperature above room temperature, said variable light extinction characteristic being such that maximum light extinction is obtained by heating said body to a temperature $T_2$ which lies above room temperature and cooling said body to room temperature; minimum light extinction is obtained by heating said body above a temperature $T_1$ which lies between room temperature and said temperature $T_2$ and cooling said body to room temperature; and light extinctions of varying magnitude are obtained by heating said body to a temperature between room temperature and said temperature $T_1$ and cooling said body to room temperature; wherein:

images of maximum light extinction are obtained by image-wise heating said body from a state in which said body exhibits minimum light extinction at room temperature, to a temperature above said temperature $T_2$ and cooling said body to room temperature;

images having light extinction of diminishing magnitude are obtained by image-wise heating said body from a state in which said body exhibits maximum light extinction at room temperature to a temperature T between room temperature and said temperature $T_1$, and cooling said body to room temperature, and images of minimum light extinction are obtained by image-wise heating said body from a state in which said body exhibits maximum light extinction or light extinction of diminished magnitude at room temperature, to a temperature between said temperature $T_1$ and said temperature $T_2$ and cooling said body to room temperature.

12. The imaging process of claim 11 which further comprises the step of uniformly heating said body to a temperature in excess of said temperature $T_1$ or said temperature $T_2$ so as to cause said body to uniformly exhibit maximum light extinction or to uniformly exhibit minimum light extinction and thereby cause images in said body to be erased.

13. The imaging process of claim 12 wherein said further step comprises heating said body to a temperature above said temperature $T_1$ but below said temperature $T_2$ so as to induce a state of uniform minimum light extinction.

14. The imaging process of claim 12 wherein said further step comprises heating said body to a temperature above $T_2$ so as to induce a state of uniform maximum light extinction.

15. The imaging process of claim 12 wherein the difference between said temperature $T_1$ and said temperature $T_2$ is at least 5° C.

16. The process of claim 11 wherein said material (A) is a polyester formed by reacting an aromatic dicarboxylic acid and an aliphatic diol and said material (B) is docosanic acid.

17. The process of claim 11 wherein said material (A) is a copolymer of vinylidene chloride and acrylonitrile and said material (B) is docosanic acid.

18. The process of claim 11 wherein said material (A) is a vinyl chloride-vinyl acetate copolymer and said material (B) is docosanol.

19. The process of claim 11 wherein said material (A) is a film forming resin and said material (B) is docosanic acid or docosanol.

20. The imaging process of claim 1 wherein said material (B) is docosanol or docosanic acid.

21. The process of claim 11 wherein said material (B) is docosanol or docosanic acid.

* * * * *

UNITED STATES PATENT AND TRADEMARK OFFICE
CERTIFICATE OF CORRECTION

PATENT NO. : 4,695,528
DATED : September 22, 1987
INVENTOR(S) : Wolfgang H. Dabisch et al It is certified that error appears in the above-identified patent and that said Letters Patent is hereby corrected as shown below:

Column 5, line 13 "addng" should be --adding--

Column 8, line 57 "carboylic" should be --carboxylic--

Signed and Sealed this

Twenty-fourth Day of May, 1988

Attest:

DONALD J. QUIGG

Attesting Officer

Commissioner of Patents and Trademarks